(12) United States Patent
Lo et al.

(10) Patent No.: US 7,985,065 B2
(45) Date of Patent: Jul. 26, 2011

(54) PITCH ADJUSTMENT DEVICE FOR BLOW MOLDING MACHINE

(75) Inventors: Chih-Chung Lo, Taichung County (TW); Chien-Pin Li, Taichung County (TW); Tsung-Yu Yang, Taichung County (TW)

(73) Assignee: Chumpower Machinery Corp., Taichung County (TW)

( * ) Notice: Subject to any disclaimer, the term of this patent is extended or adjusted under 35 U.S.C. 154(b) by 495 days.

(21) Appl. No.: 12/210,396

(22) Filed: Sep. 15, 2008

(65) Prior Publication Data

US 2010/0068329 A1 Mar. 18, 2010

(51) Int. Cl.
*B29C 49/42* (2006.01)

(52) U.S. Cl. .................. 425/534; 198/459.1; 198/459.4; 198/468.3

(58) Field of Classification Search .................. 425/526, 425/534; 198/459.1, 459.4, 468.3
See application file for complete search history.

(56) References Cited

U.S. PATENT DOCUMENTS

| | | | |
|---|---|---|---|
| 4,241,009 A * | 12/1980 | Sokolow | 264/532 |
| 6,457,967 B1 * | 10/2002 | Suzuki et al. | 425/526 |
| 6,787,096 B2 * | 9/2004 | Boscaratto et al. | 198/468.3 |
| 7,727,454 B2 * | 6/2010 | Freire-Diaz et al. | 198/468.3 |

FOREIGN PATENT DOCUMENTS

| | | |
|---|---|---|
| TW | 365573 | 8/1999 |
| TW | 453945 | 9/2001 |
| TW | 097203621 | 7/2008 |

* cited by examiner

*Primary Examiner* — Robert B Davis
(74) *Attorney, Agent, or Firm* — WPAT, PC; Justin King (57) ABSTRACT

A pitch adjustment device for blow molding machine is disclosed, which comprises: a platform, a driving unit, a screw rod unit, and a plurality of clipping units. The screw rod unit is composed of a transmission mechanism and a screw rod, in which the screw rod is pivotally mounted on the platform in a manner that when the platform is driven to move, the moving platform will activate the transmission mechanism for bringing along the screw rod to rotate. In a preferred embodiment, the screw rod has a plurality of guide slots formed thereon in a manner that, for any two neighboring guide slots, the two pitches measured between corresponding ends of the two neighboring guide slots are different from each other, so that when the platform is driven to move in a rectilineal motion reciprocatively which brings along the screw rod to move and rotate accordingly, the pitches between the plural clipping units are varied accordingly as the plural clipping units are disposed at positions corresponding to the guide slots, and thereby, the pitches between any two neighboring bottle embryos hold by their corresponding clipping units are varied.

15 Claims, 11 Drawing Sheets

PITCH ADJUSTMENT DEVICE FOR BLOW MOLDING MACHINE

FIELD OF THE INVENTION

The present invention relates to a technique for transmitting bottle embryos in a blow molding machine, and more particularly, to a quick-response and short-stroke pitch adjustment device.

BACKGROUND OF THE INVENTION

Generally, a blow molding machine used for producing PET plastic bottles is comprised of a feeding unit, a transportation unit, a heating unit, a blow molding unit and a finished product ejection unit. Operationally, bottle embryos are fed into the transportation unit by the feeding unit for carrying the same to the heating unit to be heated to a specific temperature, and then the heated bottle embryos are inserted into the molds of the blow molding unit for blow molding, and after blowing molding, the bottle embryos are transformed into finished products which are to be served by the finished product ejection unit.

For enhancing production efficiency, the blow molding unit usually are configured with more than one mold to be used for blow molding more than one bottle embryos into finished products at the same time. However, as there are a batch of bottle embryos to be inserted into the molds of the blow molding unit all at the same time, it is important to have the pitches between any two neighboring bottle embryos to be adjusted matching to those between their corresponding molds, so that the bottle embryos of the same batch can be properly inserted into their corresponding molds after being fed into the blow molding unit.

For matching the pitches between any two neighboring bottle embryos with the pitches between their corresponding molds, some blow molding machine adopts a kind of transportation unit that is capable of transporting a plurality bottle embryos one after another while spacing any two neighboring bottle embryos by a distance matching to the fixed pitch measured between their corresponding molds, as the one shown in TW Pat. No. 365573.

However, as there are fixed pitches between molds, the bottle embryos in the molds that are being transported by the transportation unit are being fed into the heating unit separately one after another in a manner that as soon as a bottle embryos enters the heating unit, the transportation unit will travel a distance equal to the pitch between the molds before the following bottle embryos can be fed into the heating unit so that the heating efficiency of the heating unit is considered to be adversely affected. One the other hand, if the bottle embryos are being fed into the heating unit one immediately after another without any delay, the heating unit will have better heating efficiency.

Consequently, there are some conventional blow molding machine adopts the design for feeding the bottle embryos into its heating unit one immediately after another, as the one disclosed in TW Pat. No. 453945.

Although the heating efficiency of the blow molding machine with ability to fed its bottle embryos into its heating unit one immediately after another is comparatively better, it will require to have an additional device to enlarger the interval between any two neighboring heated bottle embryos for matching with the pitch between their corresponding mold for preparing the heated bottle embryos to be sent to the blow molding unit. It is noted that such additional pitch enlarging unit is also disclosed in TW Pat. No. 453945.

Figure 1:
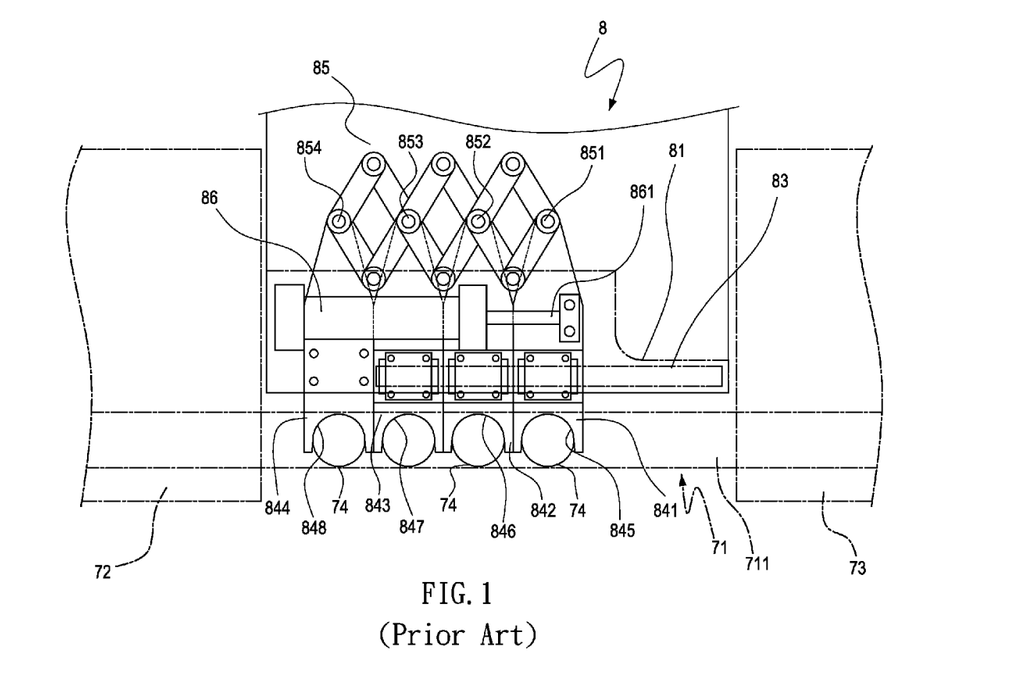
FIG. 1 is a top view of a pitch enlarging unit for conventional blow molding machines.
Figure 2:
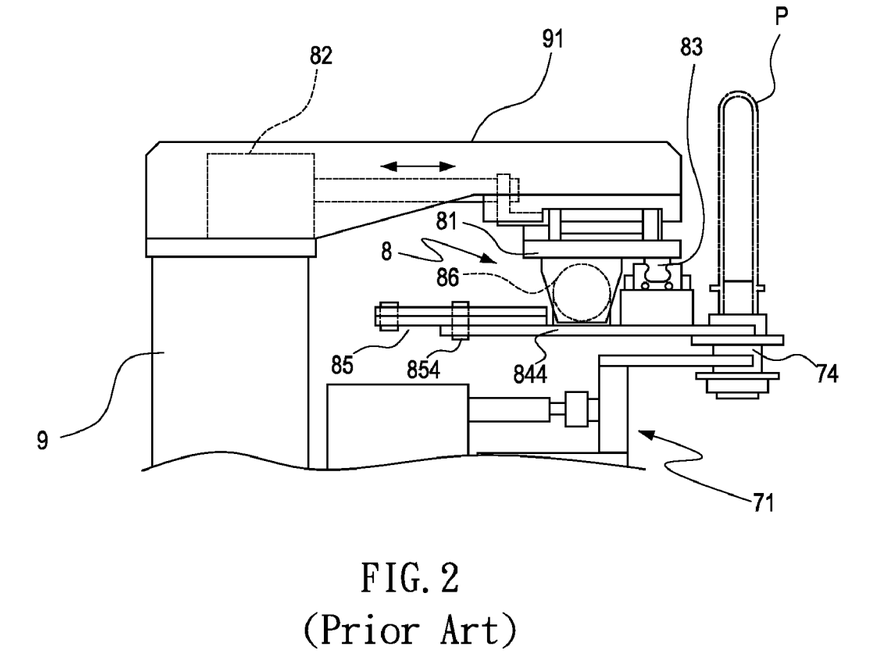
FIG. 2 is a side view of a pitch enlarging unit for conventional blow molding machine
Figure 3:
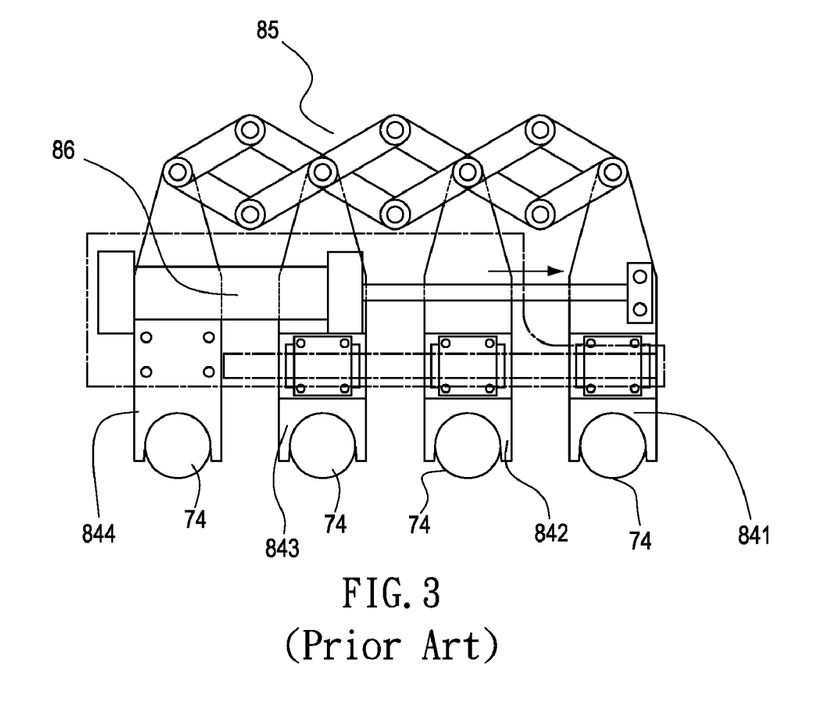
FIG. 3 is a schematic view showing the operation of the pitch enlarging unit shown in FIG. 1.

Please refer to FIG. 1 to FIG. 3, which is a top view and a side view of a pitch enlarging unit for conventional blow molding machines, and a schematic view showing the operation of the pitch enlarging unit.

As shown in the figures, the pitch enlarging unit 8 is mounted on a guide rail 711 of a transportation unit 71 for enabling the same to travel between a heating unit 72 and a blow molding unit 73. In FIG. 2, the pitch enlarging unit 8 is disposed at the tip of a supporting arm 91 mounted on a base 9, which is configured with a supporting plate 81, being arranged for enabling the same to be driven to move reciprocatively by a direct-acting cylinder 82 in a direction perpendicular to the guide rail 711.

There is a linear rail 83 mounted on the supporting plate 81 for the four carrying elements 841, 842, 843, 844 to mount thereon; and there is a retractable mechanism 85 being disposed on the pitch enlarging unit 8 in a direction parallel with the guide rail 711. It is noted that the retractable mechanism 85 has a direct-acting cylinder 86 which is mounted on the supporting plate 81 and is used as a power source for driving the retractable mechanism 85 to extend or retract. Moreover, the four carrying elements 841, 842, 843, 844 are pivotally connected to the four joints 851, 852, 853, 854 in respective while the carrying element 841 is further being secured fixedly on the supporting plate 81, and the piston rod 861 of the direct-acting cylinder 86 is connected to the carrying element 841. As shown in FIG. 2, there is a groove 845~848 being formed at the tip of each of the four carrying elements 841, 842, 843, 844, which is used for receiving the carrier 74 carrying a bottle embryo P as the carrier 74 is being transported by the transportation unit 71.

Operationally, as soon as there are carriers 74 with bottle embryos P to be sent to the pitch enlarging unit 8 by the transportation unit 71, the direct-acting cylinder 82 is activated for pushing the supporting plate 81 toward the guide rail 711 so as to prepare the grooves 845~848 of the carrying elements 841, 842, 843, 844 for receiving carriers 74 in respective, as shown in FIG. 2.

Thereafter, another direct-acting cylinder 86 will drive the retractable mechanism 85 to extend for bringing along the carrying elements 841~843 to slide along the linear rail 83 and thus causing the pitches between any two neighboring carriers 74 to enlarge, as shown in FIG. 3.

Then, the direct-acting cylinder 82 is acted to pull the supporting plate 81 backward for detaching the carrying elements 841~844 from their corresponding carriers 74 for enabling the carriers 74 to be sent to the blow molding unit 73 by transportation unit 71, i.e. as soon as the pitches between any two neighboring carriers 74 are enlarged, the carriers 74 will be released from their corresponding carrying elements 841~844 for enabling the same to be sent to the blow molding unit 73 by transportation unit 71. Finally, the direct-acting cylinder 86 will drive the retractable mechanism 85 to retract so as to bring the carrying elements 841~844 back to their initial positions, i.e. the four carrying elements 841~844 are disposed one immediately after another, and thus complete a cycle of pitch enlarging operation.

However, for completing a cycle of pitch enlarging operation, the aforesaid pitch enlarging unit 8 must be designed with a structure capable of being driven by the two direct-acting cylinders 82, 86 to perform a moving operation sequentially and reciprocatively following a rectangle-shaped path as the path is defined by the direction parallel to the guide rail and the direction perpendicular to the guide rail, so that the overall structure of such pitch enlarging unit 8 can be very complex.

In addition, although the pneumatic type direct-acting cylinder is quick in response, it is disadvantageous in that it lacks the ability to position accurately. To make the matter worse, the aforesaid pitch enlarging unit 8 has two direct-acting cylinders 82, 86 which are acting in different directions and can exert influence on each other, so that pitch enlarging unit 8 may suffer severe positioning inaccuracy problem. Moreover, since the grooves 845~848 of the carrying elements 841, 842, 843, 844 are formed as open structures, they can be hold on to their corresponding carriers 74 firmly and exactly. Inevitably, the positioning inaccuracy and the open-structured grooves 845~848 are going to cause problems to the carrying elements 841~844 when they try to receive carriers 74 from the transportation unit 71 or to release carriers 74 to the transportation unit 71.

Moreover, as the retractable mechanism is composed of a plurality linkage rods that are pivotally connected with each other, it has many joints formed in the mechanism. Taking the aforesaid retractable mechanism 85 with four carrying elements for example, there are 10 joints in the structure of the mechanism. It is noted that too many joints in the structure may cause inaccuracy to any extending or retracting operation of the mechanism.

To sum up, despite that the pitch enlarging unit disclosed in TW Pat. No. 453945 is quick in response, it is disadvantageous in that it is too complex in structure and it lacks the ability to position accurately.

For solving the aforesaid problems, there is another improved pitch adjusting device being provided in TW Pat. Appl. No. 97203621. The improved pitch adjusting device is comprised of: a screw rod, a driving unit for driving the screw rod, a plurality of clipping units and an ejection mechanism. The screw rod is extending along the transmission direction of the transportation unit and reaches a blow molding unit, in which the small pitch section of the screw rod, being the portion of the screw rod next to the transportation unit, is formed with a plurality of guide slots in a manner that the pitches measured between any two neighboring guide slots at such small pitch section are equal to those between the corresponding two neighboring bottle embryos as they are being transported by the transportation unit; and the large pitch section of the screw rod, being the portion of the screw rod next to the blow molding unit, is formed with a plurality of guide slots in a manner that the pitches measured between any two neighboring guide slots at such large pitch section are equal to those between the corresponding two neighboring molds of the blow molding unit; and the large pitch section is connected to the small pitch section by a variable pitch section. The plural clipping units are disposed at positions corresponding to disposition of guide slots on the screw rod. As each clipping unit is used for holding a bottle embryo and is driven to move by the screw rod, the clipping units, each holding a bottle embryo, are gradually being transferred from the large pitch section to the small pitch section of the screw rod so that the pitches between bottle embryos are varied with pitch variation between the guide slots, and thus the pitches between embryos can be adjusted during the transportation between the transportation unit and the blow molding unit.

However, there are still disadvantages existed in the aforesaid pitch adjusting device being provided in TW Pat. Appl. No. 97203621, which are described in the following:

(1) As both the small pitch section and the large pitch section of the screw rod must be designed with sufficient lengths for the plural clipping units to disposed about, consequently, the overall length of the screw rod is enlarged that is going to cause additional problems, such as the stroke of the whole blow molding operation is prolonged and the time required for pitch adjustment is increased.

(2) The aforesaid guide slot with variable pitch design can only be realized on a screw rod with large enough diameter. However, the thicker the screw rod is, the more costly it is to be manufactured, not to mention that the response of such thicker screw rod will be adversely affected as it is going to be more heavier.

(3) As the clipping units holding the bottle embryos are being transferred between the small pitch section, the variable pitch section and the large pitch section, the connections between such transferring could be problematic when it comes to noise.

Therefore, it is in need of a pitch adjustment device for blow molding machine for overcoming the aforesaid problems.

SUMMARY OF THE INVENTION

The primary object of the present invention is to provide a pitch adjustment device for blow molding machine, capable of overcoming problems troubling the prior-art blow molding machines, by which not only the time required for adjusting pitches between bottle embryos is reduced, but also the stroke of the whole blow molding operation is shortened, since the screw rod is formed with guide slots to be used for bringing along the corresponding clipping units to move accordingly which will then cause the pitches between bottle embryos to change with the rotation of the screw rod while it is being driven to move.

Another object of the invention is to provide a pitch adjustment device for blow molding machine, in which the length of its screw rod is greatly reduced comparing to prior arts, and thus, since the weight of the whole screw rod set is reduced, not only the response is enhanced, but also its manufacturing cost is decreased.

Yet, another object of the invention is to provide a pitch adjustment device capable of transferring its clipping units smoothly on its screw rod since all the guide slots formed on the screw rod are separated from each other by a same interval, and thereby, there will be less noise being generated.

To achieve the above object, the present invention provides a pitch adjustment device for a blow molding machine, adapted to be disposed at a position between a heating unit and a blow molding unit of the blow molding machine while conforming to a transmission direction of a transportation unit in the blow molding machine, which comprises:

a platform;

a driving unit, for driving the platform to move linearly and reciprocatively;

a screw rod unit, further comprising:
a transmission mechanism; and
a screw rod, having a plurality of guide slots formed thereon while being pivotally mounted on the platform in a manner that when the platform is being driven to move, the transmission mechanism is activated by the moving platform for bringing along the screw rod to rotate;

a plurality of clipping units, each being slidably mounted on the platform at positions corresponding to the plural guide slots to be used for fixedly securing bottle embryos;

wherein, the plural guide slots are formed on the screw rod in a manner that they are separated from each other by a same interval and, for any two neighboring guide slots, the two pitches measured between corresponding ends of the two neighboring guide slots are respective predefined; and the pitches between the plural clipping units are varied by the rotation of the screw rod as the plural clipping units are disposed at positions corresponding to the guide slots, and thereby, as the screw rod is being driven to move and thus rotate when the platform is moving, the pitches between any two neighboring clipping units will be varied accordingly which is then causing the pitches between bottle embryos hold by their corresponding clipping units to vary in the moving process of the platform.

It is noted that as the screw rod is being brought to rotate by the transmission mechanism, the length of the screw rod is greatly reduced comparing to prior arts, and thus not only the time required for adjusting pitches between bottle embryos is reduced, but also the stroke of the whole blow molding operation is shortened.

Moreover, as the length of the screw rod is greatly reduced comparing to prior arts, not only the weight of the whole screw rod set is reduced so that the response is enhanced, but also its manufacturing cost is decreased.

Furthermore, since all the guide slots formed on the screw rod are separated from each other by a same interval, its clipping units can be moved smoothly according to the guidance of their corresponding guide slots by the use of rollers, and thereby, there will be less noise being generated.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 4:
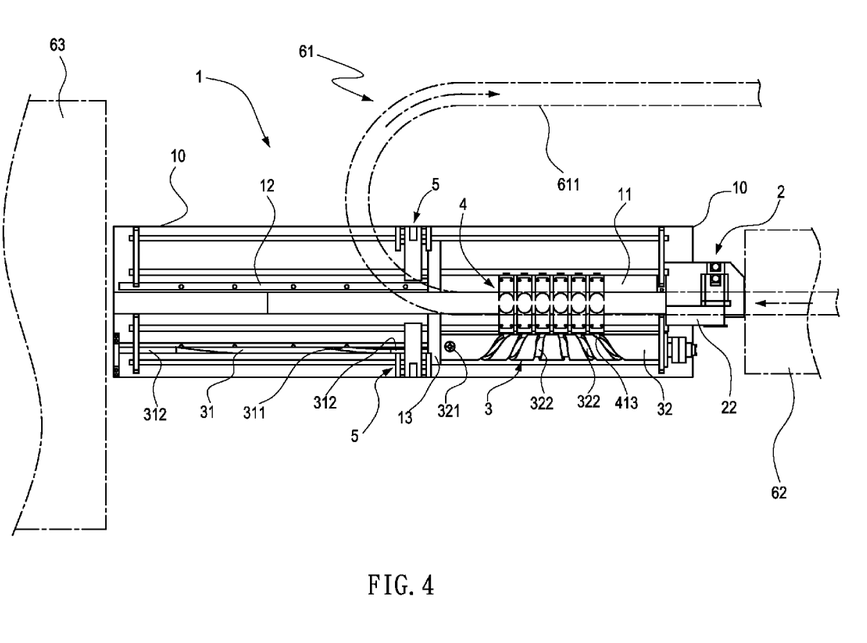
FIG. 4 is a top view of a pitch adjustment device for blow molding machine according to an exemplary embodiment of the invention.
Figure 5:
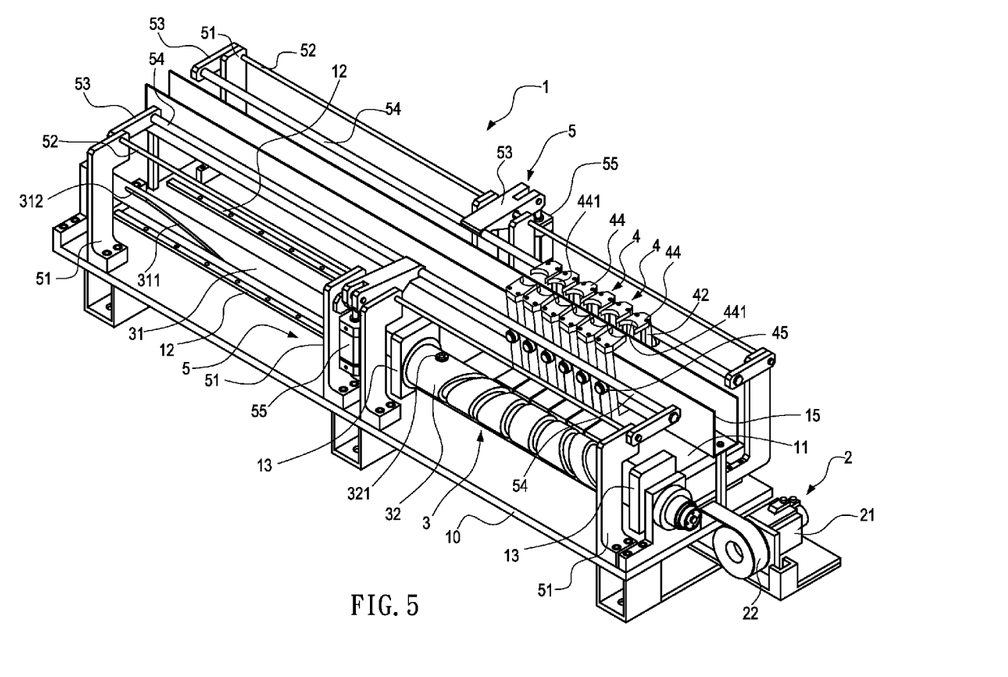
FIG. 5 is a three-dimensional view of a pitch adjustment device for blow molding machine according to an exemplary embodiment of the invention.
Figure 6:
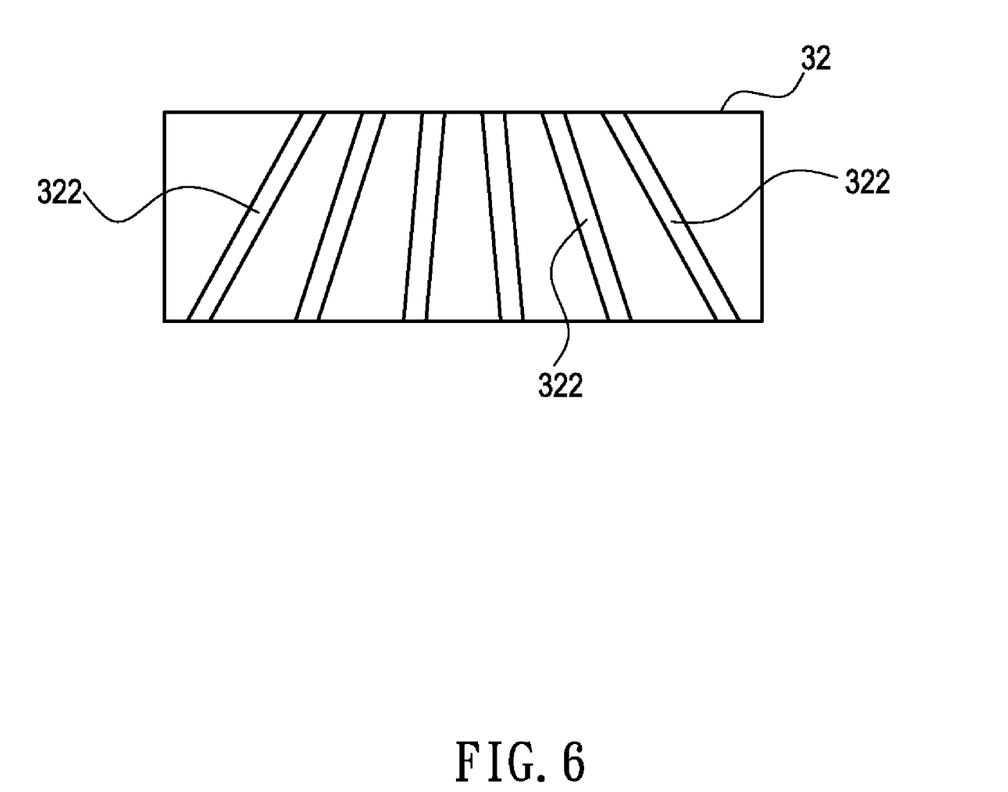
FIG. 6 is a schematic surface development diagram of a screw rod in a pitch adjustment device of the invention.
Figure 7:
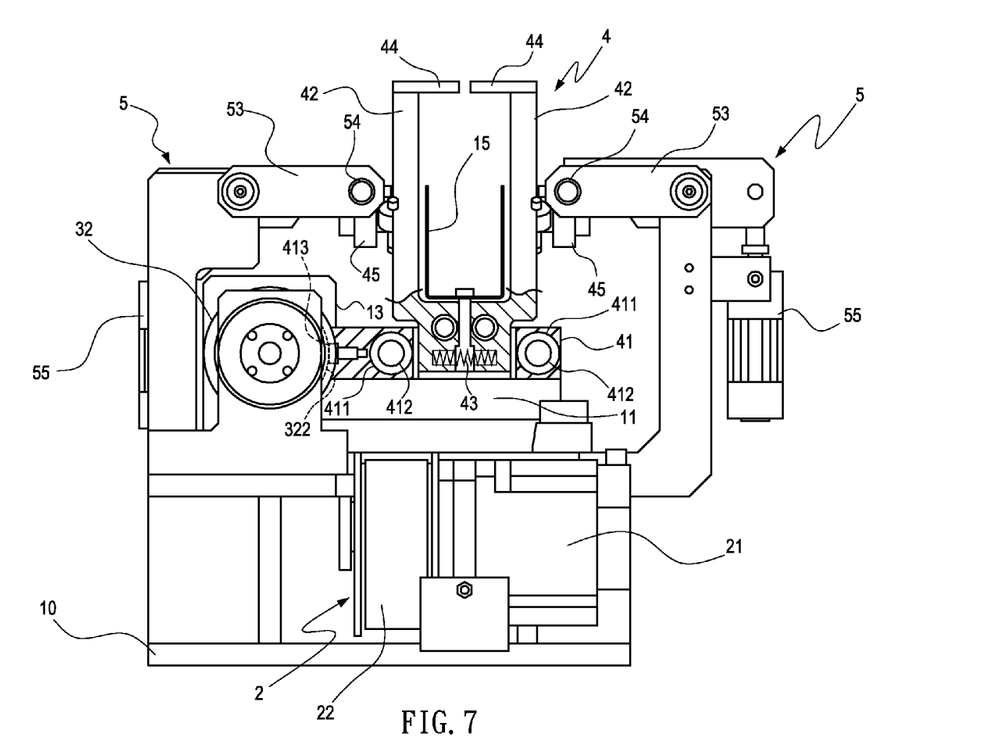
FIG. 7 is a schematic diagram showing a portion of a clipping unit used in a pitch adjustment device of the invention.

Please refer to FIG. 4 to FIG. 7, FIG. 4 is a top view of a pitch adjustment device for blow molding machine according to an exemplary embodiment of the invention; FIG. 5 is a three-dimensional view of a pitch adjustment device for blow molding machine according to an exemplary embodiment of the invention; FIG. 6 is a schematic surface development diagram of a screw rod in a pitch adjustment device of the invention; and FIG. 7 is a schematic diagram showing a portion of a clipping unit used in a pitch adjustment device of the invention.

In the above embodiment, the pitch adjustment device 1 not only is aligned in correspondence with the rail 611 of the transportation unit 61 in the blow molding machine, but also is aligned along with a transportation path defined between the heating unit 62 and the blow molding unit 63.

The pitch adjustment device 1 is configured with a base 10, provided for a platform 11, a driving unit 2, a screw rod unit 3, a plurality of clipping units 4 and an ejection unit 5 to mounted thereat There are two linear rails 12 being disposed between the bottom of the platform 11 and the base 10, which are extending from the heating unit 62 toward the blow molding unit 63 to be used for enabling the platform 11 to move linearly and reciprocatively on the base 10 along the linear rails 12. It is noted that there are two pivot seats 13 being disposed on the platform 11 respectively at the two ends thereof, provided for the screw rod unit 3 to pivotally coupled thereon.

The driving unit 2 has a servo motor 21 to be used for driving a toothed belt 22 to move, and thereby, enabling the servo motor 21 to bring the platform 11 to move reciprocatively in a precise manner as the platform 11 is connected to the toothed belt 22 and the toothed belt 22 is arranged extending from the heating unit 62 toward the blow molding unit 63.

The screw rod unit is composed of a transmission mechanism and a crew rod. In this embodiment, the transmission mechanism is substantially an inner rod 31, being fixed on the base 10 in parallel to the moving direction of the platform; and the two ends of the screw rod are pivotally connected to the two pivot seats 13 on the platform 11 in respective for disposing the same in between the two pivot seats 13.

The inner rod 31, being configured with a spiral groove 311 on the circumference thereof, is slidably ensheathed by the screw rod 32 while aligning the spiral groove 311 with a roller 321 of the screw rod 32 for enabling the screw rod 32 to be driven to rotate in synchronization with the movement of the inner rod 31. It is noted that the inner rod 31 is configured with two linear sections 312 respectively at the two ends of the spiral groove 311 while enabling the pitch measured between the two linear sections 312 to be smaller than the lead of the spiral groove 311. There are a plurality of guide slots 322 formed on the screw rod 32 in a manner that they are separated from each other by a same interval, and one of the two pitches, i.e. P1 as shown in FIG. 6, measured between corresponding ends of the two neighboring guide slots 322 is equal to that between the corresponding two neighboring bottle embryos in the transportation unit 61 while another pitch P2 is equal to that of any two neighboring molds in the blow molding unit 63. Moreover, the stroke of each guide slot 322 in the screw rod is smaller than the lead.

As shown in FIG. 7, each of the plural clipping units 4 is configured with a frame 41 which is slidably mounted at a position between the two pivot seats 13 of the platform 11 by the used of two linear bearings 411 and a sliding bar 412. In addition, each frame 41 is configured with a roller 413 to be used for coupling the same to its corresponding guide slot 322, and thereby, when the screw rod is rotating, the guide slots 322 are able to lead their corresponding frames 41 to move accordingly.

Moreover, there are two arms 42 mounted on each frame 41 in a manner that they are positioned opposite to each other while sandwiching a spring 43 in between so that the two arms 42 can be situated in a closed status by the resilience of the spring 43. In addition, there is a pair of claws 44 being respectively attached to the tips of the two arms 42 for clipping a bottle embryo.

At the outer side of each arm 42, there is a rolling part 45 being disposed corresponding to the ejection unit 5. Thereby, by using the ejection unit 5 to push the rolling parts 45, the two arms 42 can be brought along to move toward or away from each other for clipping or releasing the bottle embryo.

The ejection unit 5 has a plurality of struts 51 to be used for mounting the same on the base 10. There is a pivot shaft 52 being arranged between the plural struts 51 that is provided for a plurality of swing arms 53 to pivotally coupled thereat. Moreover, for each swing arm 53, there is a pushing rod 54 being arranged at an end thereof which is close to the clipping units 4 while connecting its another end to a pneumatic cylinder 55 of its corresponding strut for using the extension/retraction of the pneumatic cylinder 55 to bring along its corresponding swing arm 53 to swing.

For each clipping unit 4, there is a collector 15 being placed on the base 10 at a position corresponding thereto. Each collector 15 is fixedly mounted on the base 10 while being aligned with a transportation path of the bottle embryos defined in the blow molding machine, i.e. in a direction extending from the heating unit 62 to the blow molding unit 63. In addition, as each collector 15 is located at a position between the two arms 42 of its corresponding clipping unit 4, it can be used for collecting any bottle embryo that can not be clipped by the clipping unit 4 and thus being dropped by the same.

Figure 8:
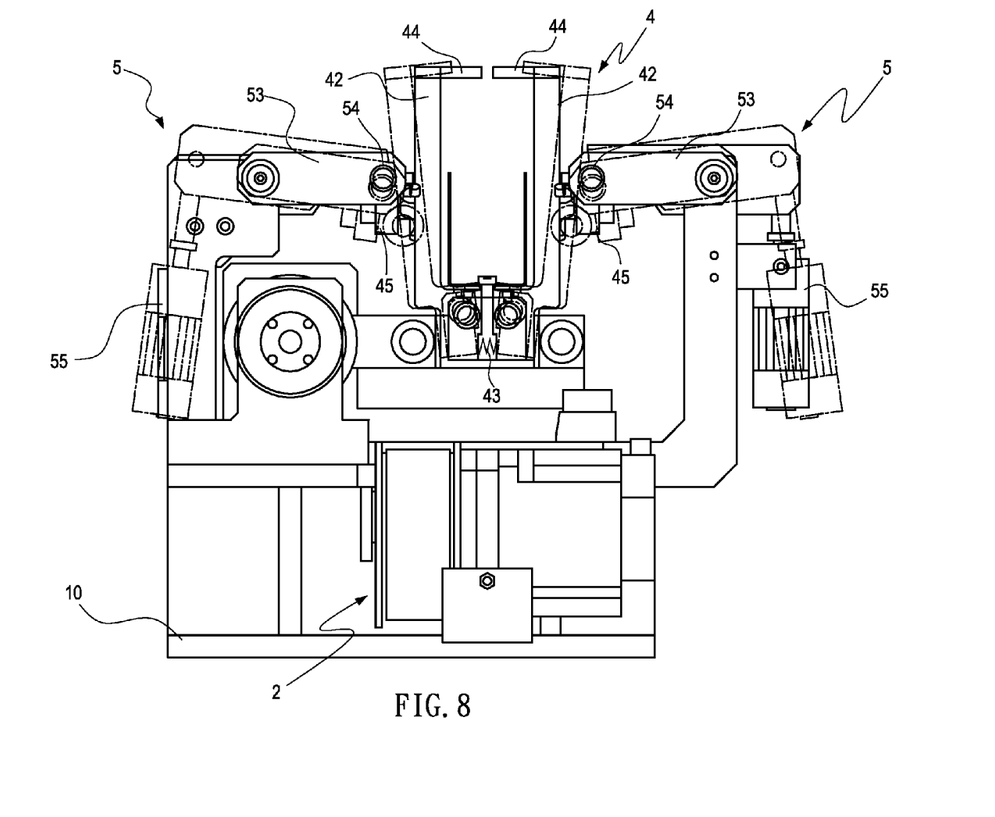
FIG. 8 is a schematic diagram showing the operation of a pitch adjustment device of the invention.
Figure 9:
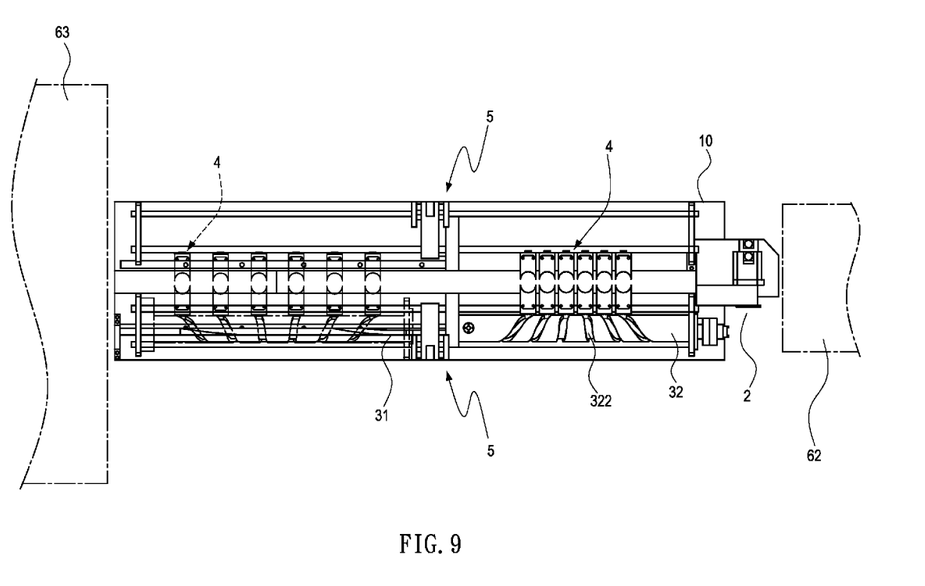
FIG. 9 is another schematic diagram showing another operation of a pitch adjustment device of the invention.

Please refer to FIG. 8 and FIG. 9, which are two schematic diagrams showing two different operations of a pitch adjustment device of the invention. When the pitch adjustment device 1 of the invention is situated at its initial status, each pneumatic cylinder 55 of the ejection unit 5 is in extension position and thus each corresponding swing arm 53 is pushed to be located at a position indicated by the dotted line of FIG. 8, by that the pushing rods 54 at the tips of the swing arms 53 will press and thus force the rolling parts 45 to move downward for forcing the two arms 42 to open. At the same time, the plural clipping units 4 are located at positions near the heating unit 62 as the solid line shown in FIG. 9, as such that the distance between any two neighboring clipping units 4 is equal to the pitch measured between any two neighboring bottle embryos in the transportation unit 61.

Thereafter, after the bottle embryos are heated by the heating unit 62, the heated bottle embryos will be transported by the transportation unit 61 for placing each of the bottle embryo at a position corresponding to its clipping unit 4. Immediately after that, each pneumatic cylinder 55 of the ejection unit 5 is retracted so that the resilience of the spring 43 will cause the two arms 42 to close for enabling the claws 44 to grasp the corresponding bottle embryo, as the solid line shown in FIG. 8.

Then, as the driving unit 2 is activated to drive the platform 10 to move toward the blow molding unit 63, the screw rod 32 that is pivotally coupled to the pivot seats 13 is driven to moved relative to the inner rod 31 that is fixed on the base 10, and the same time that it is going to rotate while moving. The rotation of the screw rod 31 is going to enlarge the pitches between the guide slots 322 which is then going to cause the pitches between the clipping units 4 to enlarge until they are equal to the pitches between molds in the blow molding unit 63, as the dotted line shown in FIG. 9.

As soon the pitches between the clipping units 4 equal to the pitches between molds in the blow molding unit 63, each pneumatic cylinder 55 of the ejection unit 5 is driven to extend for bringing along the corresponding swing arm 53 to press downward that causes the pushing rods 54 at the tips of the swing arms 53 to press and thus force the rolling parts 45 to move downward for forcing the two arms 42 to open for providing the bottle embryos to the blow molding unit 63. Thereafter, the platform 11 is moved back to its initial position by the driving unit 2.

In this embodiment, as and the inner rod 31, being configured with a spiral groove 311 on the circumference thereof, is slidably ensheathed by the screw rod 32 while aligning the spiral groove 311 with a roller 321 of the screw rod 32, the linear reciprocating movement of the platform that is driven by the toothed belt 22 will push the screw rod 32 to rotate and also to move relative to the inner rod 31. Thereby, the pitches between clipping units 4 that are arranged at positions corresponding to the guide slots 322 are going to be changed accordingly, and thus causing the pitches measured between any two neighboring bottle embryos as they are clipped by their corresponding clipping units 4 are going to be changed in the path between the transportation unit and the blow molding unit.

As the inner rod 31 is slidably ensheathed by the screw rod 32, it is possible to form the required spiral groove and the guide slots at the same section of the whole screw rod unit 3. Consequently, the overall length of the screw rod unit 3 can be effectively reduced comparing to prior arts so that not only the time required for adjusting pitches between bottle embryos is reduced, but also the stroke of the whole blow molding operation is shortened.

In addition, also as the inner rod 31 is slidably ensheathed by the screw rod 32, not only the weight of the whole screw rod set is reduced so that the response is enhanced, but also its manufacturing cost is decreased. Moreover, since all the guide slots formed on the screw rod are separated from each other by a same interval, its clipping units can be moved smoothly according to the guidance of their corresponding guide slots by the use of rollers, and thereby, there will be less noise being generated.

Figure 10A:
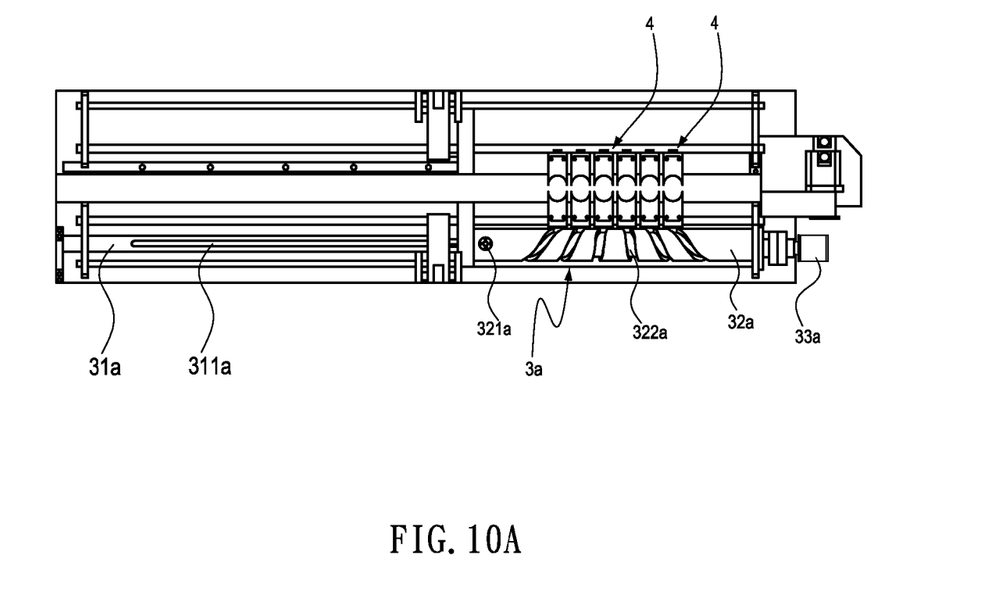
FIG. 10A shows a pitch adjustment device for blow molding machine according to a second embodiment of the invention.
Figure 10B:
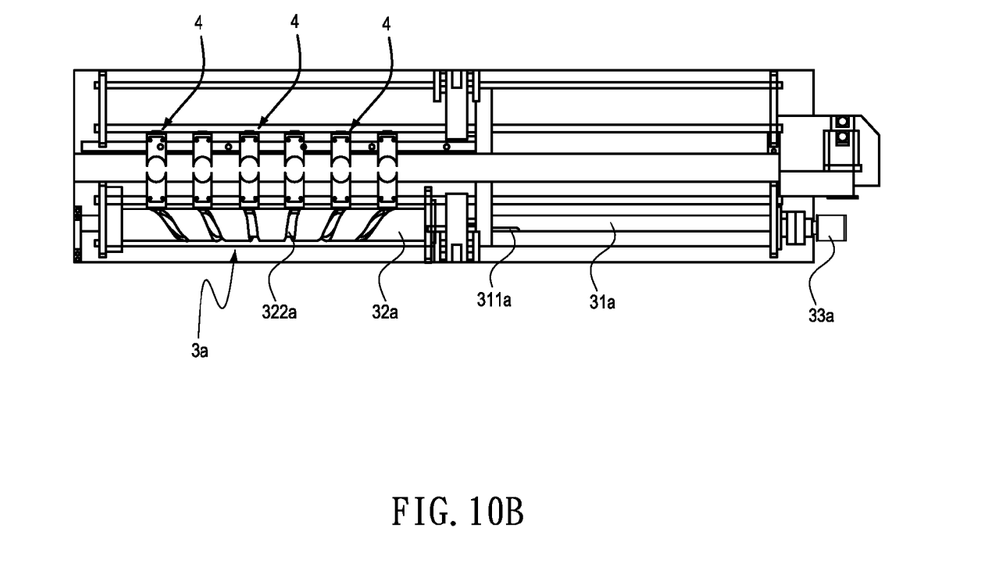
FIG. 10B shows the operation of the pitch adjustment device of FIG. 10A.

Please refer to FIG. 10A and FIG. 10B, which show a pitch adjustment device for blow molding machine according to a second embodiment of the invention, and the operation thereof. In this embodiment, the transmission mechanism is comprised of: an inner rod 31a and a second driving unit 33a. The inner rod 31a is configured with a linearly extending sliding groove 311a to be provided for the screw rod 32 and its roller 321a to fitted thereat, and is connected to the second driving unit 33a by an end thereof for enabling the inner rod 31a to be driven to rotate by the second driving unit 33a. It is noted that the second driving unit 33a can be a set of servo motor, but is not limited thereby. For example, the second driving unit 33a can be a transmission assembly as the driving unit shown in the first embodiment.

In the second embodiment, when the screw rod 32a is driven to move by the platform, by the cooperation between the roller 321a and the sliding groove 311a, the screw rod 32a is sliding along the inner rod 31a, and during the sliding, the screw rod 32a is driven to rotate as the inner rod 31a is driven to rotate by the second driving unit 33a. Thereby, the pitches between clipping units 4 that are arranged at positions corresponding to the guide slots 322a are going to be changed accordingly, as shown in FIG. 10B, and thus achieves the same pitch adjustment effect as that shown in the first embodiment.

Figure 11:
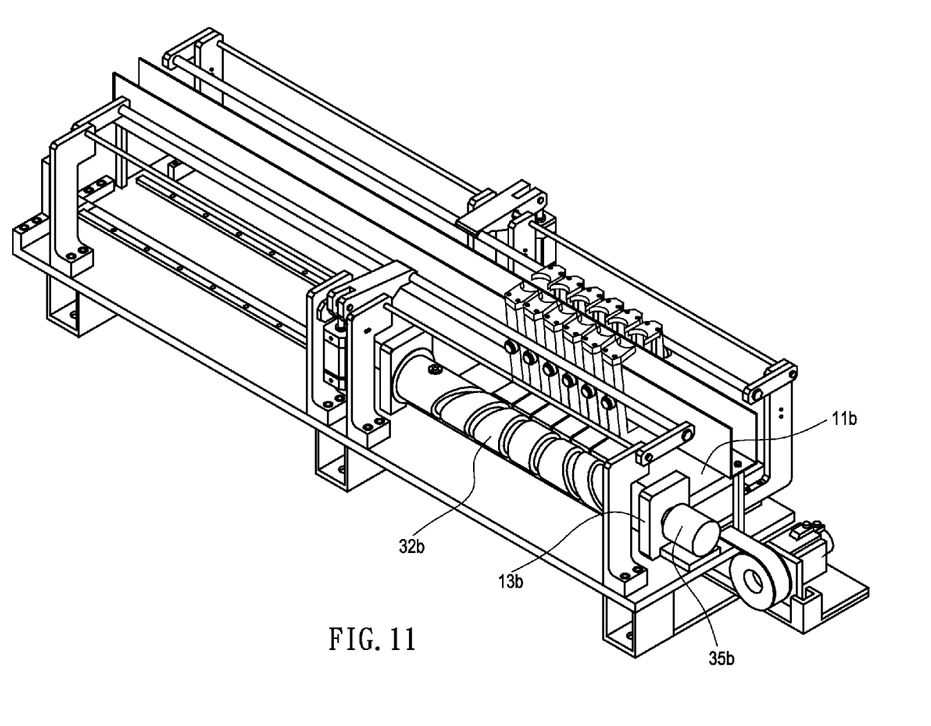
FIG. 11 shows a pitch adjustment device for blow molding machine according to a third embodiment of the invention.

Please refer to FIG. 11, which shows a pitch adjustment device for blow molding machine according to a third embodiment of the invention. In this embodiment, the transmission mechanism is substantially a set of servo motor 35b, The set of servo motor 35b is fixedly coupled to the pivot seats 13 of the platform 11b in a manner that the screw rod 32b can be driven to rotate directly by the set of servo motor 35b during the moving of the platform 11b. Thereby, it can achieve the same pitch adjustment effect as that shown in the first embodiment.

In addition, as the pitch adjustment device of the third embodiment requires no inner rod, the weight of the referring pitch adjustment device is reduced comparatively so that not only the time required for adjusting pitches between bottle embryos is reduced, but also the stroke of the whole blow molding operation is shortened with improved operation performance.

Figure 12:
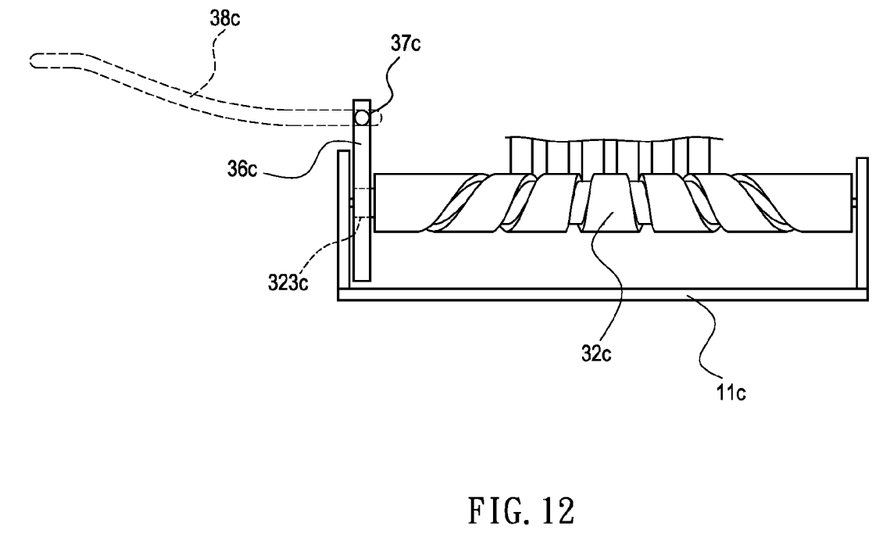
FIG. 12 shows a pitch adjustment device for blow molding machine according to a fourth embodiment of the invention.

Please refer to FIG. 12, which shows a pitch adjustment device for blow molding machine according to a fourth embodiment of the invention. In this embodiment, the transmission mechanism is substantially a gear rack 36c. The gear rack 36c is slidably mounted on the platform 11c while insetting a roller 37c, being arranged on the gear rack 36c, into a cam path 38c as the cam path is designed to vary in height along the moving direction of the platform 11c. In addition, the screw rod 32c has a gear 323c being arranged at a position corresponding to the gear rack 36c.

Basically, the cam path 38c can be a groove formed on a plate, or can be a bended iron bar, that are known to those skilled in the art and thus are not described further herein.

When the screw rod 32c is being driven to move by the platform 11c, not only the height of the gear rack 36c is being changed by the cooperation between the roller 37c and the cam path 38c, but also the gear rack 36 will bring along the gear 323 and thus the screw rod 32c to rotate. Thereby, it can achieve the same pitch adjustment effect as that shown in the first embodiment.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A pitch adjustment device for a blow molding machine, comprising:
   a platform, capable of being driven to move linearly and reciprocatively while enabling its moving direction to be the same as a transportation path defined in the blow molding machine;
   a driving unit, for driving the platform to move linearly and reciprocatively;
   a screw rod unit, further comprising:
   a transmission mechanism; and
   a screw rod, having a plurality of guide slots formed thereon while being pivotally mounted on the platform in a manner that when the platform is being driven to move, the transmission mechanism is activated by the moving platform for bringing along the screw rod to rotate;
   a plurality of clipping units, each being slidably mounted on the platform at positions corresponding to the plural guide slots to be used for fixedly securing bottle embryos;
   wherein, the plural guide slots are formed on the screw rod in a manner that they are separated from each other by a same interval and, for any two neighboring guide slots, the two pitches measured between corresponding ends of the two neighboring guide slots are respective predefined; and the pitches between the plural clipping units are variable by the rotation of the screw rod as the plural clipping units are disposed at positions corresponding to the guide slots, and thereby, as the screw rod is being driven to move and thus rotate, the pitches between any two neighboring clipping units will be varied accordingly which is then causing the pitches between bottle embryos hold by their corresponding clipping units to vary.

2. The pitch adjustment device of claim 1, further comprising:
   a base, being disposed at a position between a transportation unit and a blow molding unit of the blow molding machine and being provided for the platform to dispose thereon.

3. The pitch adjustment device of claim 2, further comprising:
   a linear rail, disposed at a position between the platform and the base.

4. The pitch adjustment device of claim 1, wherein the transmission mechanism is configured with an inner rod in a manner that it is fixed parallel to the moving direction of the platform; and the inner rod, being configured with a spiral groove on the circumference thereof, is slidably ensheathed by the screw rod while aligning the spiral groove with a roller of the screw rod for enabling the screw rod to be driven to rotate in synchronization with the movement of the inner rod.

5. The pitch adjustment device of claim 4, wherein the inner rod is configured with two linear sections respectively at the two ends of the spiral groove while enabling the pitch measured between the two linear sections to be smaller than the lead of the spiral groove.

6. The pitch adjustment device of claim 5, wherein the stroke of each guide slot in the screw rod is smaller than the lead.

7. The pitch adjustment device of claim 1, wherein the transmission mechanism further comprises:
   an inner rod, having a linearly extending sliding groove formed on the circumference thereof and being pivotally mounted on the platform while enabling the same to be disposed parallel with the moving direction of the platform; and
   a second driving unit, for bringing along the inner rod to rotate and thus, as the sliding groove is aligned with a roller of the screw rod, causing the screw rod to slide along the inner rod while being driven to rotate in synchronization with the rotation of the inner rod.

8. The pitch adjustment device of claim 7, wherein the second driving unit is a set of servo motor.

9. The pitch adjustment device of claim 1, wherein the transmission mechanism is a set of servo motor, being fixedly mounted on the platform to be used for driving the screw rod to rotate as the platform is moving.

10. The pitch adjustment device of claim 1, wherein the transmission mechanism is configured with a gear rack in a manner that the gear rack is slidably mounted on the platform while insetting a roller, being arranged at an end of the gear rack, into a cam path as the cam path is designed to vary along the moving direction of the platform, and thereby, when the screw rod is being driven to move by the platform, not only the gear rack is being brought along to move in synchronization therewith, but also the position of the gear rack is altered by the cam path, causing the screw rod to be brought along to rotate as well.

11. The pitch adjustment device of claim 1, wherein, for any two neighboring guide slots, one of the two pitches measured between corresponding ends of the two neighboring guide slots is equal to that between the corresponding two neighboring bottle embryos in the transportation unit while another pitch is equal to that of any two neighboring molds in the blow molding unit.

12. The pitch adjustment device of claim 1, wherein the driving unit has a servo motor to be used for driving a toothed belt to move, and thereby, enabling the servo motor to bring the platform to move reciprocatively in a precise manner as the platform is connected to the toothed belt.

13. The pitch adjustment device of claim 1, wherein there are two pivot seats being disposed on the platform respectively at the two ends thereof, provided for the screw rod to pivotally coupled thereon.

14. The pitch adjustment device of claim 1, wherein each of the plural clipping units is configured with a roller for matching the clipping units with their corresponding guide slots.

15. The pitch adjustment device of claim 1, further comprising:
 a collector, fixedly mounted on the base while being aligned with a transportation path of the bottle embryos defined in the blow molding machine for enabling the collector to be used for collecting any bottle embryo not being clipped by the plural clipping units.

* * * * *